United States Patent [19]

Jahns et al.

[11] Patent Number: 4,917,456
[45] Date of Patent: Apr. 17, 1990

[54] OPTICAL CROSSOVER NETWORK

[75] Inventors: Jurgen Jahns, Shrewsbury; Miles J. Murdocca, Jackson, both of N.J.

[73] Assignee: AT&T Bell Laboratories, Murray Hill, N.J.

[21] Appl. No.: 219,623

[22] Filed: Jul. 15, 1988

[51] Int. Cl.$^4$ .......................... G02B 27/14; H04B 9/00
[52] U.S. Cl. .................................. 350/169; 364/200; 370/1
[58] Field of Search .............. 350/169, 171, 172, 174, 350/617; 364/713, 822, 200; 370/1

[56] References Cited

U.S. PATENT DOCUMENTS

| | | | |
|---|---|---|---|
| 4,546,244 | 10/1985 | Miller | 250/211 J |
| 4,708,424 | 11/1987 | Marhic | 350/96.16 |
| 4,811,210 | 3/1989 | McAulay | 364/822 |

FOREIGN PATENT DOCUMENTS 2608176 9/1977 Fed. Rep. of Germany .

OTHER PUBLICATIONS

*Proceedings of the IEEE,* vol. 72, No. 7, Jul. 1984, "Architectural Considerations Involved in the Design of an Optical Digital Computer", A. Huang, pp. 780–786.
*IEEE Transactions on Computers,* vol. C-20, No. 2, Feb. 1971, "Parallel Processing with the Perfect Shuffle", H. S. Stone, pp. 153–161.
*Applied Optics,* vol. 27, No. 9, May 1, 1988, "Optical Design of Programmable Logic Arrays", M. J. Murdocca et al, pp. 1651–1660.
*VLSI Systems and Computations,* Computer Science Press (1981), pp. 186–195, "Compact Layouts of Banyan/FFT Networks", D. S. Wise.

*Primary Examiner*—Bruce Y. Arnold
*Assistant Examiner*—Ronald M. Kachmarik
*Attorney, Agent, or Firm*—Henry T. Brendzel

[57] ABSTRACT

A crossover network is obtained by using a plurality of similar optical crossover stages. Each stage includes two light paths that combine at an output plane. One path provides the direct connection while the other path provides the crossover connection. To realize this crossover capability, each stage comprises a beam splitter element that accepts a beam containing an image array and develops therefrom two beams that are each directed in two different paths. Along one path, means are provided for reversal of selected segments of the image array and for sending of the reversed or crossed-over image through a beam combiner. Along the second path, means are provided for applying the light to a beam combiner without the image reversal. One disclosed means for image reversal is a prismatic mirror. The number of corners in such a mirror differs from stage to stage.

14 Claims, 10 Drawing Sheets

OPTICAL CROSSOVER NETWORK

BACKGROUND OF THE INVENTION

This invention relates to switching and, more particularly, to optical switching associated with communication and/or computing.

The interest attracted by optical digital switching and computing is mainly stimulated by its potential to implement massively parallel architectures. This holds especially true for free space systems where logic arrays of 100 by 100 logic devices or more can be connected through imaging setups. Free-space propagations also offers the potential to do the communications within such a computer at an extremely high temporal bandwidth without introducing problems such as clock skew or crosstalk.

The use of optical imaging setups for parallel interconnects, however, restricts the variety of feasible topologies to networks that possess an interconnection pattern that is regular, because one would wish to treat an entire image array (comprising many light rays) as a single beam. On the other hand, even when networks with regular connection patterns are more difficult to use in computing applications the high space-bandwidth product of an optical system, i.e., the exceptionally large number of connections that can be established concurrently, offers the potential for reducing the overall complexity of the interconnection scheme. For this reason, interest has grown in regular interconnection networks such as the perfect shuffle or the banyan. These networks are sometimes referred to as alignment networks. Alignment networks have been used in digital processing for implementing fast algorithms, and a number of publications exist about the use of such networks in optical systems. See, for example, A. Huang, "Architectural Considerations Involved in the Design of an Optical Digital Computer," *Proc. IEEE* 72, No. 7, (1984) 780–786; and H. S. Stone "Parallel Processing with the Perfect Shuffle" *IEEE Transactions Comp.* C-20, No. 2 (1971) 153–161.

The regularity of alignment networks such as the perfect shuffle or the banyan does, in fact, seem to limit the flexibility of designing a digital general purpose computer. A circuit with a specific interconnection pattern is sometimes difficult to wrest from a network with regular connectivity. It has been shown, however, that these networks can be used for general purpose computers efficiently in terms of gate count and throughput. See, for example, Murdocca et al. "Optical Design of Programmable Logic Arrays," *Applied Optics* May 1988.

On a computational level, the perfect shuffle and the banyan are isomorphic. From a systems point of view, however, the implementations of different (though isomorphic) alignment networks imposes different problems. These arise mainly from the fact that, in general, alignment networks are spacevariant, which means that the interconnection pattern is dependent on the input position of the network node, or the pixel. That condition does not fit well with optics and, therefore, attempts to implement these networks with optic setups result in losses of light intensity and resolution.

A space variant network that exhibits a regular connectivity and can be implemented with essentially no light loss is the crossover network. One such network, designed for VLSI applications, has been described by Wise, in "Compact Layouts of Banyan/FFT Networks" *VSLI Systems and Computations*, Computer Science Press (1981) pp. 186–195. His proposal was motivated by the need to have wires of equal length in order to reduce path length differences between signals. FIG. 1 depicts a diagramatic representation of Wise's crossover network. The functional elements (10) are not important in describing the network. Their function can vary with the specific applications for which the network is used. Reflection elements (20) redirect the signal flow, to effect some of the crossover connections.

For an optical implementation of the FIG. 1 network, it is interesting to note that the signals emerge from all ports under the same angle and that shifts of different value are achieved by using a different separation between the rows of elements 10, with a corresponding change in the length of reflecting elements 20. Wise's network may be useful for a waveguide-optical implementation where the lines of the diagram in FIG. 1 represent the waveguides. For a free-space optical implementation, however, it is not very well suited, since optical waves traveling in free space cannot easily be confined in both direction and space.

SUMMARY OF THE INVENTION

A simple and yet effective optical realization of a crossover network is obtained by using a plurality of similar optical crossover stages. That includes two light paths that combine at an output plane. One path provides the direct connection while the other path provides the crossover connection. Each stage comprises a beam splitter element that accepts a beam containing an image array and develops therefrom two beams that are each directed in two different paths. Along one path, means are provided for reversal of selected segments of the image array and for sending of the reversed image through a beam combiner. Along the second path, means are provided for applying the light to a beam combiner without the image reversal.

More specifically, one implementation of a crossover stage comprises a beam splitter cube that is arranged to receive the image beam at first face of the cube. The beam splits, and the resulting two beams exit at a second and third face of the beam splitter. The beam leaving at the second face is reflected off a mirror that is situated perpendicularly to the the second face, and is thus returned to the beam splitter, to be split and directed out of the first face and a fourth face of the cube beam splitter. The beam leaving at the third face is reflected off a prismatic mirror having N corners, where N is a power of two number (e.g., 1, 2, 4, ... ) and returned to the beam splitter to be split and also directed out of the first and the fourth face of the cubic beam splitter. The combined image formed at the output of the fourth face of the beam splitter comprises the output of the crossover stage.

DETAILED DESCRIPTION

Figure 1:
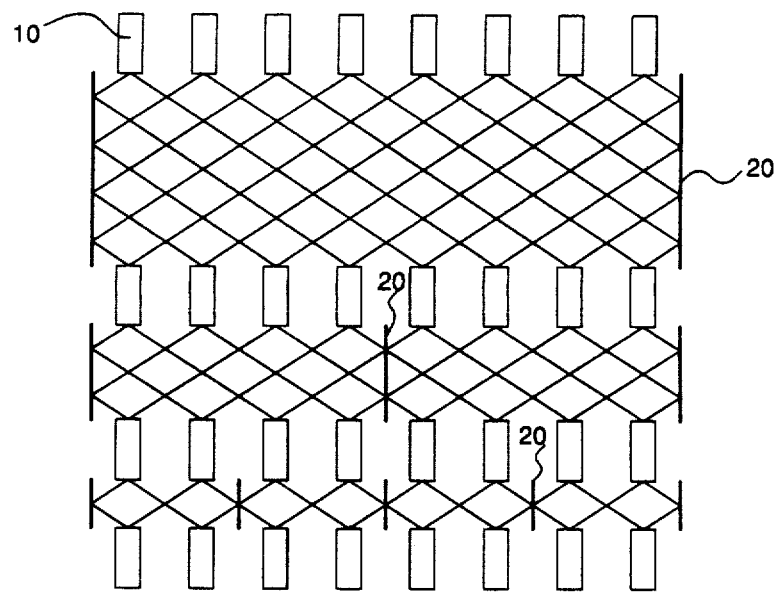
FIG. 1 shows the Wise diagramatic implementation of the crossover network.
Figure 2:
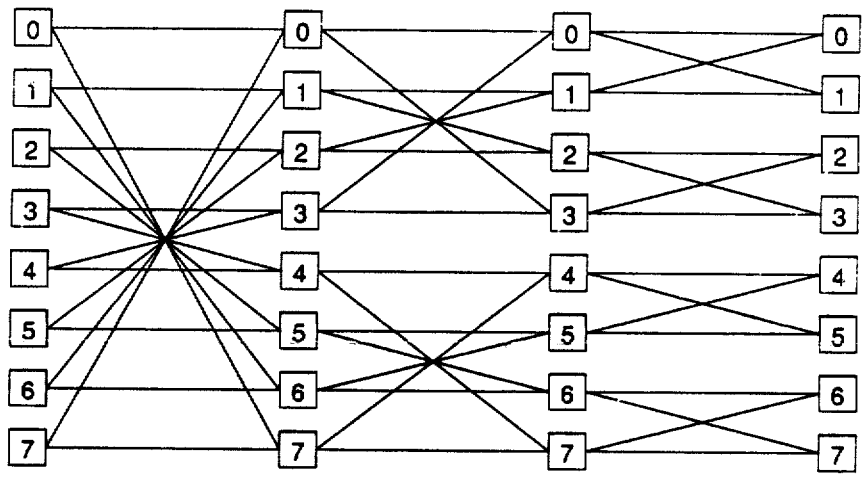
FIG. 2 describes the the connectivity of a three stage crossover network realized without invention.

FIG. 2 depicts the classical connection arrangement of a crossover network that our invention realizes. The network of FIG. 1 is functionally equivalent to it.

Figure 3:
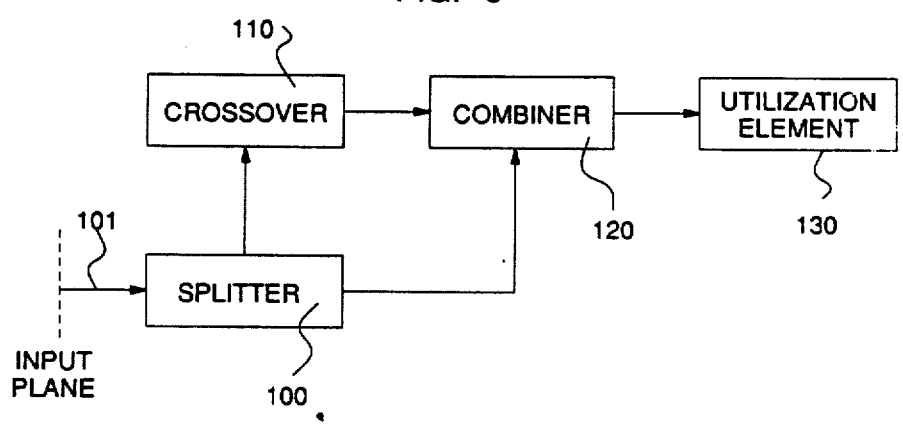
FIG. 3 presents a block diagram of a crossover stage in the network of FIG. 2.

FIG. 3 presents in a block diagram form the optical setup for each stage of the FIG. 2 network. It comprises a beam splitter 100 to which an image beam 101 is applied. Two beams are derived from beam splitter 100, with one beam being applied to image crossover element 110 and the other beam being applied to combiner element 120. The output of crossover element 110 is also applied to combiner element 120, with the output of element 120 being applied to image utilization element 130.

Figure 4:
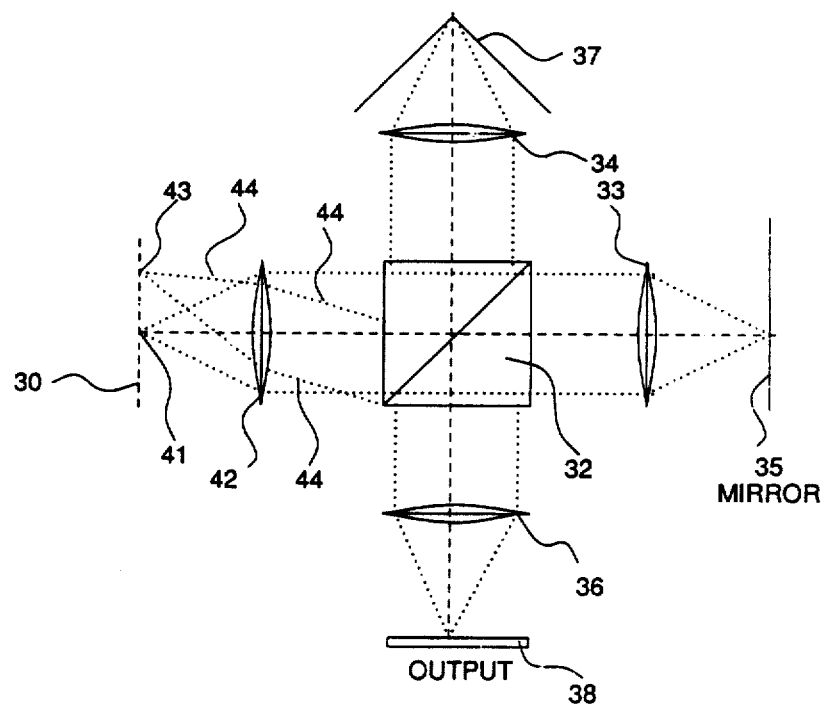
FIG. 4 depicts one implementation of an optical crossover stage in accordance with the principles of our invention.

FIG. 4 shows the optical setup that implements the first crossover stage of our network employing the principles of our invention. At the heart of the stage is beam splitter cube 32 which also serves as a beam combiner, mirror 35, and prismatic mirror 37 which provides the crossover capability. Describing the arrangement in detail, the input image array is available at plane 30, and the light emanating from the input array is passed through lens 31 and applied to beam splitter 32. Lens 31 is arranged at one focal length away from input plane 30 and that causes lens 31 to collimate the light of the image, as illustrated in FIG. 4 by light rays 42 coming from point 41 on the input plane, and light rays 44 coming from point 43 on the input plane. Element 32 splits the input image array into two copies, with one copy moving into lens 33, and the other copy moving into lens 34. At one focal distance away from lens 33 the beam is focused onto flat mirror 35 and is reflected off the mirror and reapplied to lens 33 and beam spitter 32. This reentering beam is split again, with one copy being directed to lens 36, and the other copy being directed to lens 31.

A prismatic mirror 37 faces lens 34, with its corner set at one focal length away from the lens. The prismatic mirror reflects the incoming array back to lens 34 but in the process it reverses the image portion encompassed by the mirror. The reversal is about the axis formed by the corner. The reversed and reflected image passes through lens 34, enters beam splitter 32 and splits into two copies. One copy continues to lens 36, while the other copy is deflected to lens 31. The two beams arriving at lens 36 are combined at output plane 38, which is located on focal length away from lens 36. Thus, beam splitter 32 acts as a combiner, albeit a lossy one. Of course, output plane 38 may be connected to some utilization element, as described infra, or may comprise the input to another stage.

Figure 5:
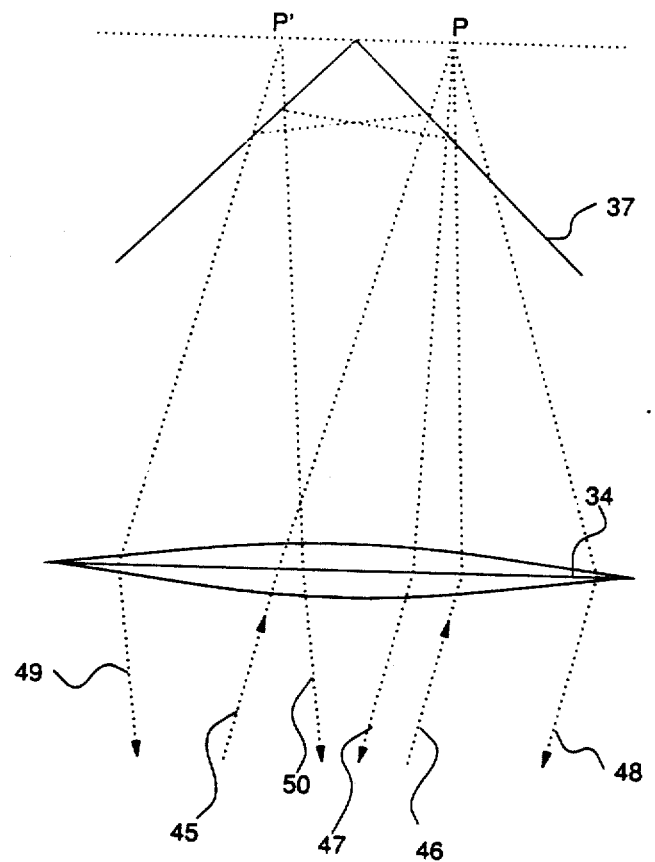
FIG. 5 shows in detail the crossover operation of prismatic mirror 37 of the FIG. 4 optical setup.
Figure 6:
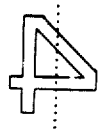
FIG. 6 illustrates the effect of mirror 37 on the numeral "4"

The reversal that is achieved by prismatic mirror 37 can be observed more clearly in FIGS. 5 and 6. In FIG. 5, a collimated incoming beam is shown by rays 45 and 46. These rays, as well as the rays between them, pass through lens 34 and are focused on point P. In the absence of mirror 37 and the presence of a flat mirror at point P, rays 45 and 46 would be returned to lens 34 as rays 47 and 48. However, the rays do not reach point P because they are deflected twice by prismatic mirror 37 and returned to lens 34 as rays 49 and 50. With prismatic mirror 37 in place, what results is a shift of the image point P to the virtual image point P'. By analogy, one can easily see that an incoming beam along rays 49 and 50 is reflected and deflected so that the returning beam appears to emanate not from point P' but from point P.

Thus, prismatic mirror 37 simply splits the image along the line of its corner, and performs a horizontal transposition. The effect is a reversal of the entire image encompassed by the prismatic mirror about the axis corresponding to its corner. The effect of this action is shown on the image of the numeral 4, depicted in FIG. 6.

Figure 7:
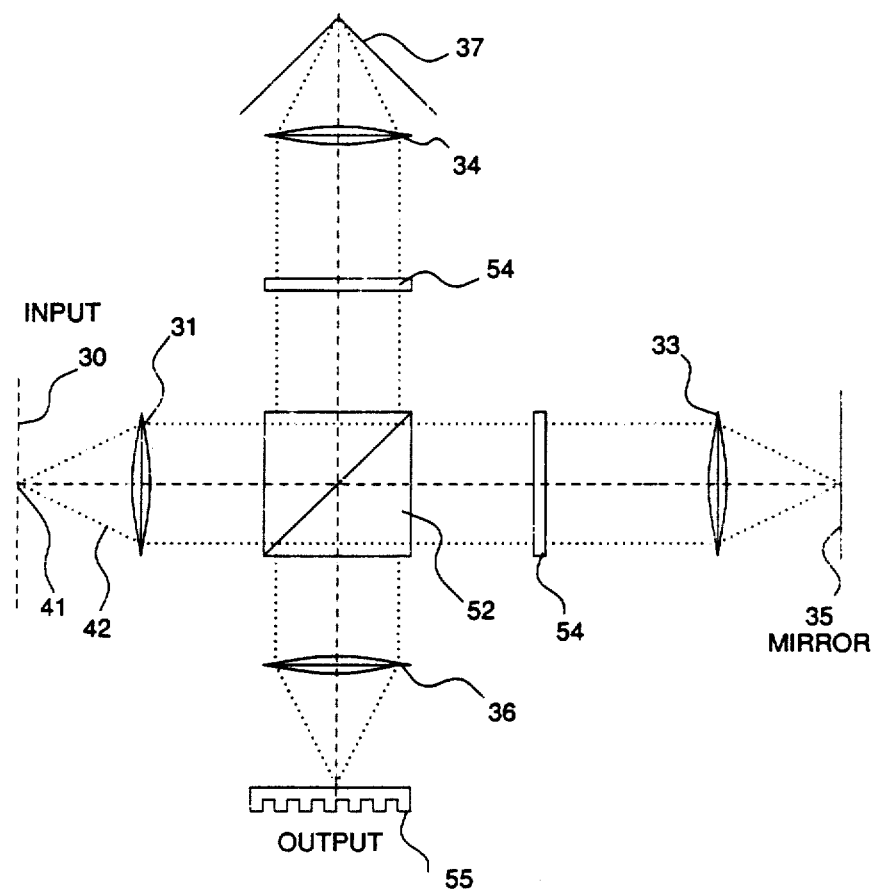
FIG. 7 depicts an implementation of an optical crossover network using a polarizing beam splitter.

It may be noted that the crossover stage of FIG. 4 exhibits light loss because the second pass through the beam splitter causes half of the light to return to lens 31. However, if one were to use a polarizing beam splitter in combination with quarter-wave plates in the two branches, no light loss would occur. FIG. 7 illustrates such a system. Specifically, the FIG. 7 crossover network employs a circularly polarized light at input plane 30, and a polarizing beam splitter 52 that deflects the y-polarized portion of the beam while passing the x-polarized portion of the beam. The path leading to lens 34 contains the y-polarized, and the path leading to lens 33 contains the x-polarized portion of the beam. At the two outputs of the beam splitter that lead to lens 33 and 34, a quarter-wave plate 54 is included, and it converts the x and y polarized light to circular-polarized light. Upon return of the beams from mirrors 35 and 37, the quarter-wave plates convert the polarization of the beams again, and the result is that the previously x-polarized light is now y-polarized, and vice versa. Beam splitter 52 deflects the y-polarized light derived from mirror 35 and passes the x-polarized light derived from prismatic mirror 37, yielding the desired combining of images at the output plane, essentially without any loss of light.

In some applications, the polarization of the light at the output plane is unimportant. In other applications, however, one may wish to have the same polarization for the direct and the crossover output images. If the input image comprises a plurality of distinct pixels with black regions between the pixels, one can arrange for the two images formed on the output plane to be offest from each other. Indeed, in most applications such a physical offset is desirable. Having such an offset, we employ a space-variant half-wave plate at the output plane to cause both images to be polarized in the same direction (e.g., y-polarized). This is shown in FIG. 7 by equalization element 55. If necessary or desirable, a quarter-wave plate following the space-variant element 55 would bring the image at the output plane to the same polarization state that the input had. This last quarter-wave plate is not shown in FIG. 7.

In many applications some operations are performed at the output plane of every stage. This may include mere switching or actual computations. In fact, both functions can be accomplished using SEED devices. For a description of SEED devices one may turn to U.S. Pat. No. 4,546,244 issued to D. A. B. Miller on Oct. 8, 1985. SEED devices are optical devices that are responsive to two optical signals, and based on those signals, the SEED devices either absorb or reflect a "power supply" beam. The logic function that can be realized is OR or NOR, which allows the power supply beam to be reflected when any one of the signal beams is present, or when none of the signal beams are present. The reflected power supply beam possesses the same polarization as the incoming power supply beam.

Figure 8:
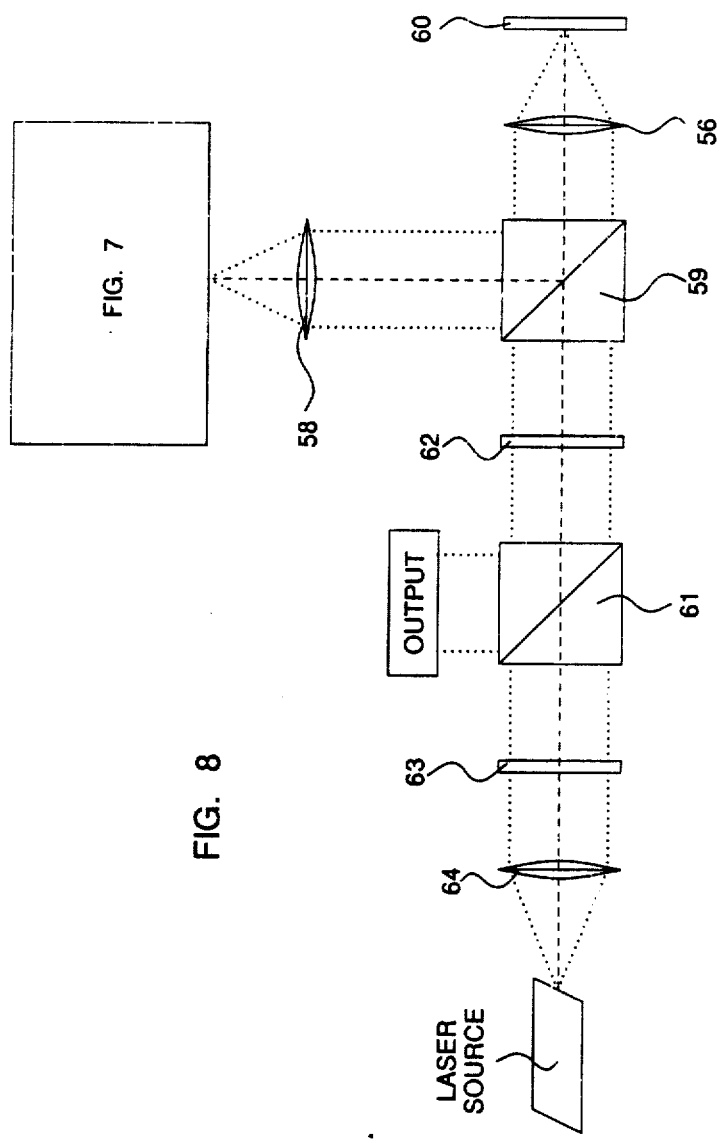
FIG. 8 displays one possible arrangement for supplying a power supply beam and means for utilizing the information derived by the crossover stage of FIG. 7.

The issue of supplying the power supply beam to the SEED devices and also observing the reflected power supply beam is a matter that must be addressed in our crossover network, if we are to use SEED devices. As shown in FIG. 8, one approach that can be employed is to follow the space-variant half-wave plate 55 with a collimating lens 58 and apply the resulting beam to a polarizing beam splitter 59 that interacts through lens 56 with plane 60 on which the SEED devices are placed. If the polarization of the beam entering beam splitter 59 (from equalization element 55) is in the y direction, then the beam is deflected and, therefore, the SEED devices plane is placed perpendicularly to lens 58. The power supply beam can then be applied, with x-polarization, from the other side of beam splitter 59, opposite the SEED devices plane. The x-polarized reflected power supply beam contains the information of the crossover stage but it returns towards the incoming power supply beam.

To distinguish the reflected power supply beam (which is the modulated signal beam from the SEED array) from the applied power supply beam, an additional beam splitter (61) is included in FIG. 8. Associated with splitter 61 there is a quarter-wave plate 62 facing beam splitter 59, and a quarter-wave plate 63 facing the power supply source. In this manner, a linearly polarized light source (e.g., a laser) is collimated in lens 64, is converted to circularly polarized light in quarter-wave plate 63, is passed through beam splitter 61 and through quarter-wave plate 62, and results in being x-polarized as desired, prior to entry into beam splitter 59. The returning x-polarized beam is also converted to circular polarization by quarter-wave plate 62 and is split within beam splitter 61. This arrangement results in separation of the applied power supply beam and the reflected power supply beam. However, this arrangement also results in a double loss of light; once when the power supply beam passes through beam splitter 61, and once when the reflected power supply beam again passes through beam splitter 61.

It may be noted in passing that the power supply light source is not a single beam but, rather, a collection of light spots of precise positioning (to meet the SEED devices at the appropriate locations) and of essentially equal light intensity.

Figure 9:
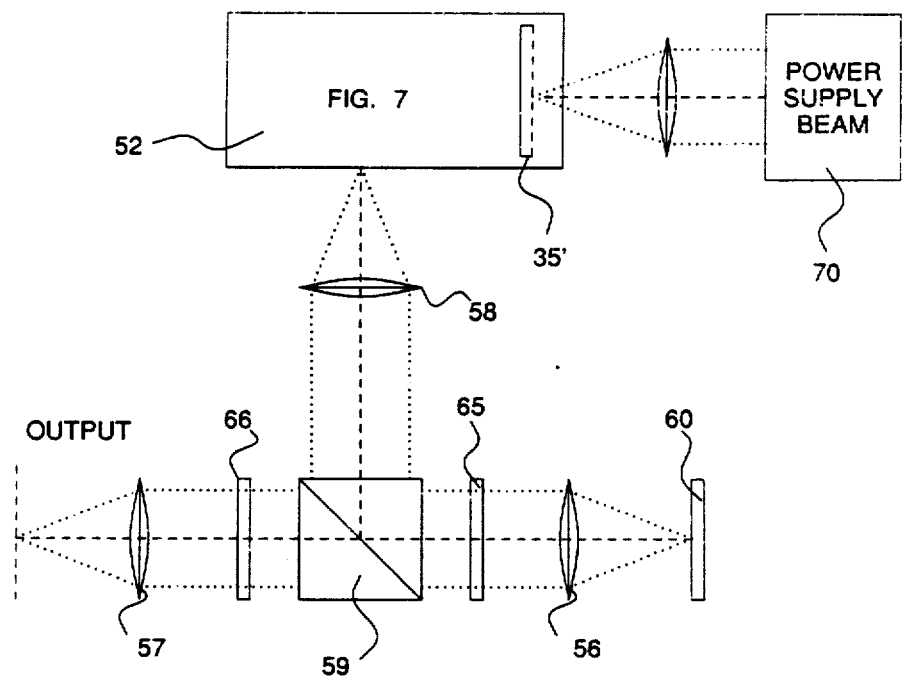
FIG. 9 presents another arrangement for supplying a power supply beam and means for utilizing the information derived from the crossover network of FIG. 7.

A much better realization is achieved, in accordance with our invention, with the setup depicted in FIG. 9, where the power supply beam is generated in element 70. The power supply beam, comprising an array of spots, can be obtained by the use of a collimated laser beam that is passed through a lenslet array or a Dammann binary phase grading followed by a Fourier lens. Such a system is shown, for example, in Offenlegungsschrift 26-08-176, dated Sept. 1, 1977.

In FIG. 9, the power supply beam is generated in element 70 and arranged to focus its light spots onto element 35'. Element 35' serves the function of mirror 35 in FIG. 4, except that it is arranged to be reflective only where necessary, i.e., at the locations where the pixels of the input image appear at the element. At other locations element 35' is transparent, and element 70 is arranged to focus its light spots at the transparent regions. The light of element 70 must of course be of the appropriate polarization mode, to wit, the same polarization as the light reflected off mirror 35' (circular polarization). Also, this setup assumes that the input array that is reflected off mirror 35' comprises as collection of spots and no information in between.

In the FIG. 9 arrangement, the collimated output of lens 58, which contains the two image beams and the power supply beam, is applied to a beam splitter 59. Since all of the applied light signals applied are of y-polarization, they are deflected onto SEED plate 60 through quarter-wave plate 65 and lens 56. Plate 65 causes reflected power supply beam signals to be polarized in the x-direction upon their re-entry into beam splitter 59. With this polarization, the light signals pass without deflection to quarter-wave plate 66, which returns the light signals to the same polarization that they had at the input plane. That light may then be focused onto an output place via lens 57.

The implementation of higher stages of the network can be accomplished with the same setup as shown in FIG. 4, except that the number of corners in the prismatic mirror would be different for different stages of the network. Each succeeding stage has a number of corners in the prismatic mirror that is twice as large as the number of corners in the prismatic mirror of the preceding stage. Such different stages, and an arrangement interconnecting the stages are shown in FIG. 10, which depicts one embodiment for a three stage crossover network.

Figure 10:
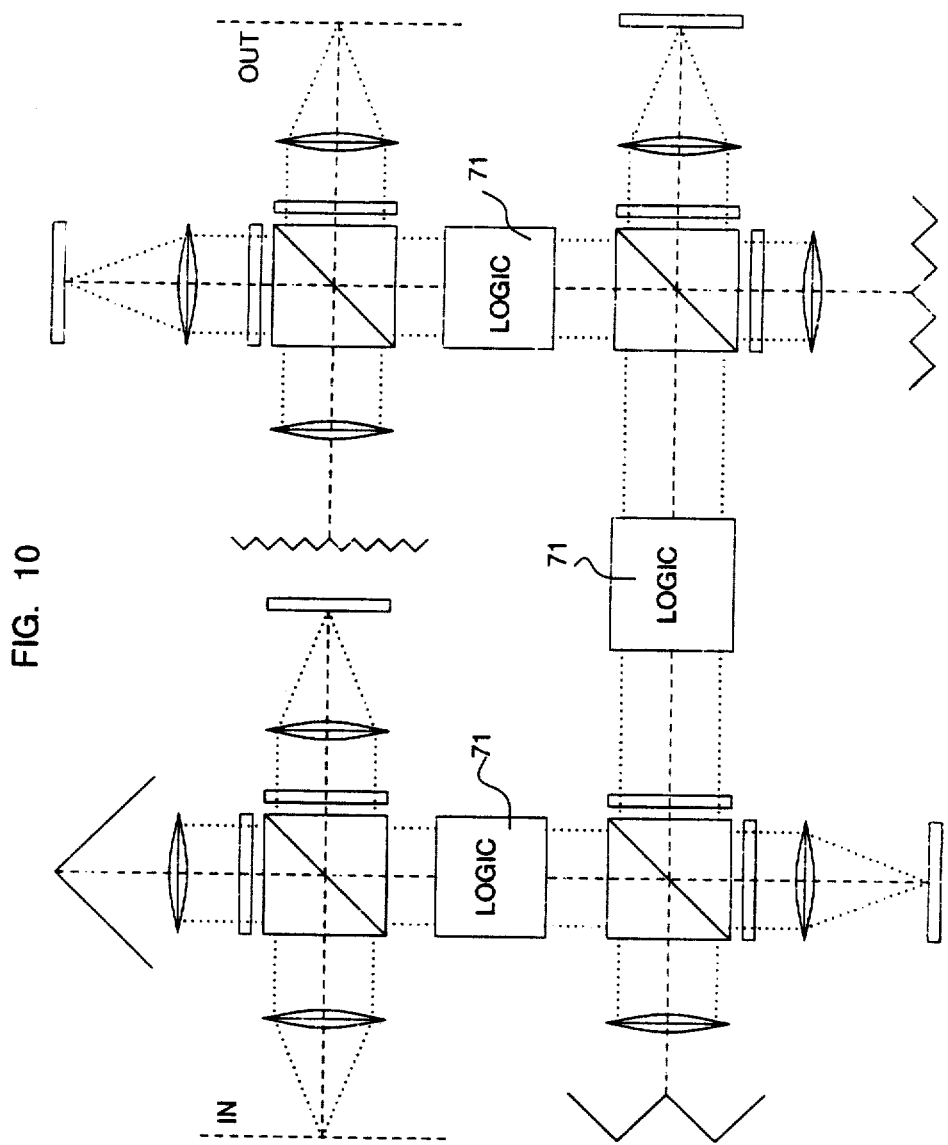
FIG. 10 depicts the optical setup for the entire four stage network of FIG. 2.

A number of salient features of the FIG. 10 embodiment may be noted. First, each stage comprises the same number of elements, and corresponding elements are identical to each other, except the prismatic mirrors. Second, between each stage there is a processing element 71. Each element 71 is functionally similar as the other elements 71. The switching or computation that is performed in the network is performed within elements 71. Third, the lenses at the input and output planes (31 and 36) are subsumed within elements 71. It may be noted in passing that a rigorous application of the teachings herein may result, in some cases, in the use of two lenses in succession, which in effect serve merely to reverse the image. In many applications there is no need to keep track of the orientation, since it is the relative positions of pixels that is important. Fourth, the positions of input and output image planes in FIG. 10 lend themselves to easy cascading of additional stages.

Figure 11:
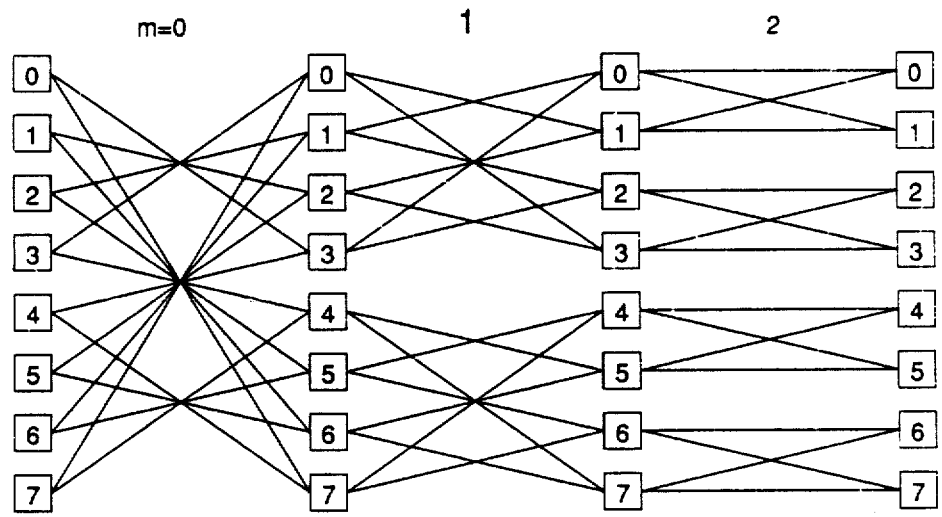
FIG. 11 shows a rearranged version of the FIG. 2 crossover network.
Figure 12:
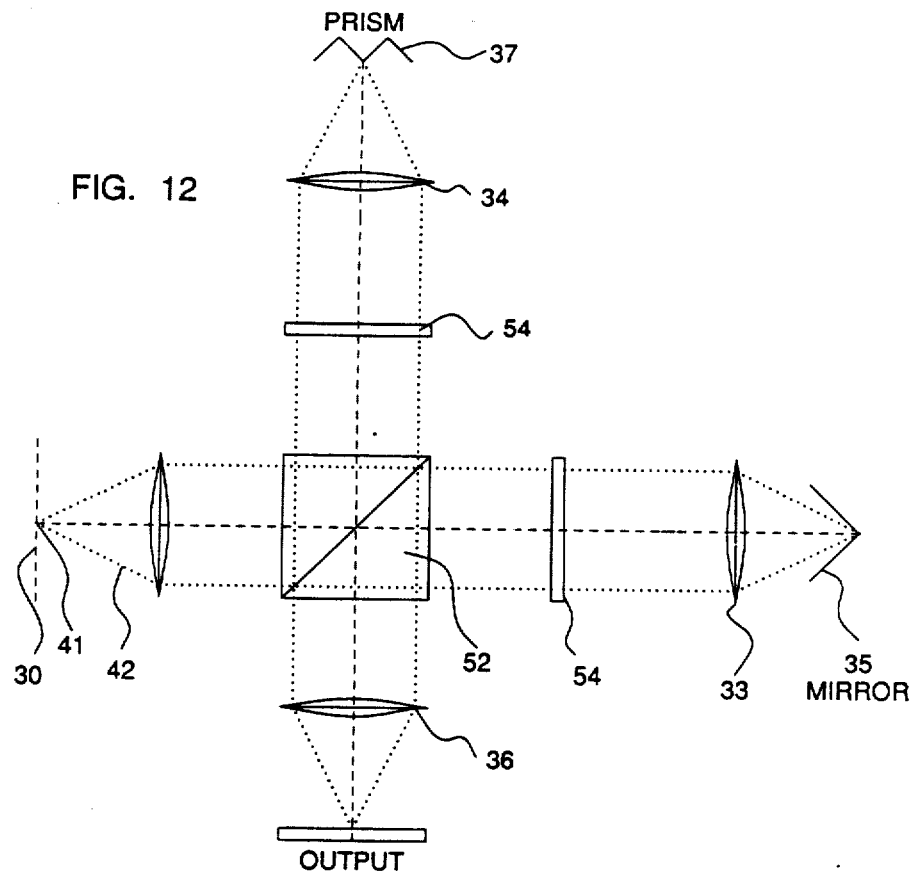
FIG. 12 presents the optical setup for realizing a crossover stage for the FIG. 11 network.

The above description and the drawings are illustrative of our invention, and the skilled artisan can easily envision different embodiments that employ the principles of our invention. For example, though we described the use for the same element as the beam splitter and the combiner, it is clear that different elements can be employed. Further, the image reversing means can be other than a prismatic mirror, such as lens (one or two dimensions) arrangements. Still further, with a rearrangement of the FIG. 2 crossover network as shown, for example, in FIG. 11, a crossover stage as depicted in FIG. 12 can be employed.

We claim:

1. An arrangement for developing two output images from one input image, with a specified spatial relationship between the two output images comprising:
   a beam splitter situated to receive said input image for developing a first beam and a second beam;
   means for partitioning the image contained in the second beam and reversing the spatial relationship of the image of said second beam about an axis substantially centered in said image to develop a third beam containing a crossover image; and
   means for combining the first beam and the third beam to form a composite image including said input image and said crossover image.

2. The arrangement of claim 1 wherein said means for partitioning separates the image contained in the second beam into a power of 2 number of partitions.

3. The arrangement of claim 1 wherein said means for combining includes a mirror and a second beam splitter.

4. The arrangement of claim 1 wherein said means for combining includes a mirror and said beam splitter.

5. The arrangement of claim 1 wherein said means for partitioning includes a prismatic mirror.

6. An arrangement for developing two output images from an applied input image, with a specified spatial relationship between said two output images, comprising:
   a beam splitter, situated to receive said applied input image for developing a first representation of the input image and a second representation of the input image;
   means for reflecting said first representation of the input image back to the beam splitter, causing said beam splitter to output the reflected image out of a specified port of the beam splitter and developing thereby one of said two output images; and
   means for reversing the spatial relationship of portions of said second representation of said input image, with each of said portions being spatially reversed about an axis that is substantially centered in said portion, to develop thereby a third representation of the input image and to send said third representation back to the beam splitter, causing said beam splitter to output said third representation out of said specified port of the beam splitter and to develop thereby the second of said two output images.

7. The apparatus of claim 6 wherein said means for reflecting includes means for including a power supply light beam with said reflected image.

8. The arrangement of claim 7 wherein said means for reflecting includes a space-variant mirror.

9. The arrangement of claim 6 wherein said beam splitter is a polarizing beam splitter, a plate is interposed between said beam splitter and said means for reflecting, and a plate is interposed between said beam splitter and said means for reversing.

10. The arrangement of claim 9 further including a lens interposed between said input beam and said beam splitter, a lens interposed between said reflecting means and the associated plate, a lens interposed between said reversing means and the associated plate, and a lens at the output of said specified port of the beam splitter.

11. A crossover network comprising:
   a plurality of crossover stages, each including
      an input port and an output port;
      a beam splitter coupled to said input port for developing a first beam and a second beam;
      means for partitioning the image contained in the second beam into N partitions and reversing the spatial relationship of the images of adjacent partitions, to develop a third beam containing a crossover image; and
      means for combining the first beam and the third beam and applying the combined image to said output port.

12. The crossover network of claim 11 where N is 2 in the first stage, and doubles with each succeeding crossover stage.

13. The arrangement of claim 11 further including a utilization element interposed between the output port of a crossover stage and the input port of the succeeding crossover stage.

14. The arrangement of claim 13 wherein said utilization element includes active elements that develop a utilization element output optical signal that corresponds to a logic relationship of the utilization element input optical signal.

* * * * *